United States Patent [19]

Ishikawa et al.

[11] Patent Number: 5,424,600
[45] Date of Patent: Jun. 13, 1995

[54] SPARK PROTECTED ALTERNATOR

[75] Inventors: Hiroaki Ishikawa, Nagoya; Hirofumi Fujimoto, Obu; Kenichi Mizuta, Toyoake, all of Japan

[73] Assignee: Nippondenso Co., Ltd., Kariya, Japan

[21] Appl. No.: 300,933

[22] Filed: Sep. 6, 1994

Related U.S. Application Data

[63] Continuation of Ser. No. 971,646, Nov. 5, 1992, abandoned.

[30] Foreign Application Priority Data

Nov. 6, 1991 [JP] Japan ................................. 3-289822
Oct. 29, 1992 [JP] Japan ................................. 4-291131

[51] Int. Cl.$^6$ .......................... H02K 9/06; H02K 11/00
[52] U.S. Cl. ...................................... 310/220; 310/59; 310/88
[58] Field of Search ............... 310/58, 59, 60 A, 60 R, 310/62, 63, 88, 220, 221

[56] References Cited

U.S. PATENT DOCUMENTS

| | | | |
|---|---|---|---|
| 2,323,146 | 6/1943 | Manney | 310/88 |
| 2,542,016 | 2/1951 | Else et al. | 310/88 |
| 2,594,003 | 4/1952 | Else et al. | 310/88 |
| 2,736,826 | 2/1956 | Hoover | 310/88 |
| 2,991,377 | 7/1961 | Vose et al. | 310/61 |
| 3,666,978 | 5/1972 | Renner | 310/62 |
| 4,680,495 | 7/1987 | Chiampas et al. | 310/220 |
| 5,317,224 | 5/1994 | Ragaly | 310/58 |

FOREIGN PATENT DOCUMENTS 5051504 3/1973 Japan .

OTHER PUBLICATIONS

Journal of Nippondenso Technical disclosure No. 39-109, Jan. 1985.
Journal of Nippondenso Technical Disclosure No. 65-207, May 1989.

*Primary Examiner*—Steven L. Stephan
*Assistant Examiner*—D. R. Haszko
*Attorney, Agent, or Firm*—Cushman, Darby & Cushman

[57] ABSTRACT

An explosion-proof type rotating electrical machine having excellent cooling and brush powder discharge capabilities. A drive shaft of a rotor is provided with slip rings for supplying current to a field coil, which is energized through brushes capable of activating the field coil by contacting with the slip rings. The brush compartment incorporated with the brushes and slip rings and the outside of the rotating electrical machine are connected with each other through an air suction path, the brush compartment and an inside space of the rotating electrical machine are connected with each other through an air blowing path, in which a flame stifling wire net is provided. When operating the rotating electrical machine in a flammable gas atmosphere, sparks generated due to a contact failure between the brushes and the slip rings ignite the flammable gas filled in the brush compartment to produce flames, the flames then reach the flame stifling wire net by a blowing cool air sucked from the air suction port, where the flames are cooled and extinguished by the flame stifling wire net. Brush powders are discharged to the outside of the brush compartment from the air blowing path by the cooling air.

12 Claims, 9 Drawing Sheets

SPARK PROTECTED ALTERNATOR

This is a continuation of application Ser. No. 07/981,646, filed on Nov. 5, 1992 now abandoned.

BACKGROUND OF THE INVENTION

1. Field of the Invention

This invention relates to an explosion-proof type rotating electrical machine capable of operating in an atmosphere of flammable gas.

2. Description of the Related Art

Conventionally, a synchronous machine and a DC machine each of the type having a field coil produce sparks between conductive contact members such as slip rings, a commutator etc and slip rings, accordingly when those rotating electrical machines are operated in a flammable gas atmosphere, such sparks tend to fire up the flammable gas generating flames.

For this reason, the explosion-proof type rotating electrical machine capable of preventing the flammable gas from being ignited has conventionally been employed for ships. For such explosion-proof type rotating electrical machines, well known examples are an enclosed type where an entire rotating electrical machine is sealed as disclosed in U.S. Pat. No. 4,680,495 and a wire net type where entire inlet and outlet ports of air of the rotating electrical machine are covered with a flame stifling wire net to prevent the flames within the rotating electrical machine from leaking to the outside of such rotating electrical machine as disclosed in Japanese Utility Model Registration Patent Application Laid Open 51054 in 1975.

Figure 14:
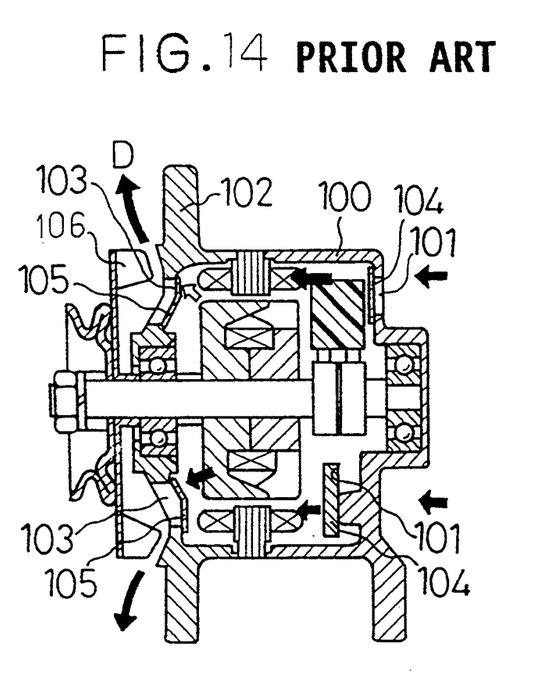
FIG. 14 is a sectional view of a conventional wire net explosion-proof type rotating electrical machine.

An example of a wire net type rotating electrical machine is shown in FIG. 14. The flame stifling wire nets 104 and 105 are each arranged on an air suction inlet 101 holed in a rear housing 100 and an air discharge outlet 103 holed in a front housing 102. Numeral 106 depicts a cooling fan.

However, when the enclosed type is used, an output thereof is largely reduced due to lack of cooling capability, and volume and weight of the rotating electrical machine are considerably increased in order to obtain a required output.

Even in the case of wire net type, the flame stifling wire net, which covers the air inlet and outlet ports, inevitably increases ventilation resistance, resulting inevitably in an output reduction due to poor cooling capability, and increases of volume and weight.

Also, sealing a small space (hereinafter referred to as a brush compartment) embracing the conductive contact members and the brushes can be considered, but in such a structure, brush powders produced by wear of the brushes build up in the brush compartment, as a result, there is a possibility to cause a short-circuit accident between the slip rings or the like.

SUMMARY OF THE INVENTION

This invention is made in view of the problem points described above, and an object thereof is to provide an explosion-proof type rotating electrical machine having excellent cooling capability and a satisfactory brush-powder discharge capability.

After intensive study to achieve the object of the invention, the present inventors, have found that, with respect to the explosion-proof type rotating electrical machine of this kind provided with brushes and conductive contact member, only a portion where the flame arises may be considered to be explosion-proof, that is, spark propagation from the brush compartment to the outside thereof should be prevented, unlike the conventional example where the entire rotating electrical machine is constructed in explosion-proof type. Accordingly, an explosion-proof type rotating electrical machine according to this invention comprises, a housing which incorporates a rotor being fixed on the rotating shaft and rotating together with the rotating shaft, and a stator a cooling fan arranged in the housing and rotating together with the rotating shaft, a brush casing having a brush compartment arranged adjacent to one-end wall of the housing, the brush compartment embracing a conductive contact member arranged on the rotating shaft and brushes conductively in contact with the conductive contact member, an air suction path for connecting the brush compartment with space outside the housing and introducing a cooling air from the outside to the brush compartment, an air blowing path for connecting the brush compartment with a space within the housing and discharging the air in the brush compartment to the space within the housing, and a flame stifling multi-hole member arranged on the air blowing path.

Preferably, in the invention, the air suction path is formed in a maze.

In another aspect of the invention, preferably, the flame stifling multi-hole member is a wire net.

In further another aspect of the invention, preferably, the flame stifling multi-hole member is a multi-holed plate.

In still another aspect of the invention, preferably the brush casing comprises a brush holder for slidably holding the brushes and a brush seal rubber for sealing a gap between the brush holder and an end wall of the housing.

In accordance with the construction described above, a current is allowed to flow between the brush and the conductive contact member, and the spark is generated if there is a contact failure between the brushes and the conductive contact member. In the flammable gas atmosphere, such sparks ignite the flammable gas and generates flames, the main energy of which propagates generally along ventilation paths or through air exhaust paths by cooling air. The flame stifling multi-hole member provided in the air exhaust path cools and extinguishes the flames and can prevent propagation of the flames to down stream side.

And the explosion-proof rotating electrical machine according to the invention being provided with flame stifling multi-hole member on the air exhaust path which connects the brush compartment with the space within the housing, it exhibits various effects as listed below:

(1) The wire net explosion-proof type and the totally enclosed explosion-proof type are not employed for the housing, therefore cool air can be satisfactorily introduced inside the housing.

(2) The flames are extinguished at a portion close to the brush compartment where the flames generate, enabling the flames to be extinguished before a flame grows bigger, and putting out fire is easier compared to those of the conventional wire net explosion-proof type rotating electrical machine.

(3) Resin system parts and rubber system parts of the motor room can be prevented from deteriorations and damages.

(4) The advantages as described above is obtained without enclosing the brush compartment, therefore the brush powders generally produced in such kind of rotating electrical machines can be discharged from the brush compartment, enabling to prevent buildup of brush powders in the brush compartment, to cause failures such as short circuits etc.

(5) Even if quenching the flames should fail with the multi-hole members, such fire is introduced into the housing and not outside the rotating electrical machine, and hence the deactivated flames, by the flame stifling multi-hole members and propagated into the housing, are again extinguished by being cooled by respective parts in the housing and housing wall surfaces, preventing flame propagation outside the rotating electrical machine.

DETAILED DESCRIPTION OF THE PREFERRED EMBODIMENT

FIRST EMBODIMENT

Figure 1:
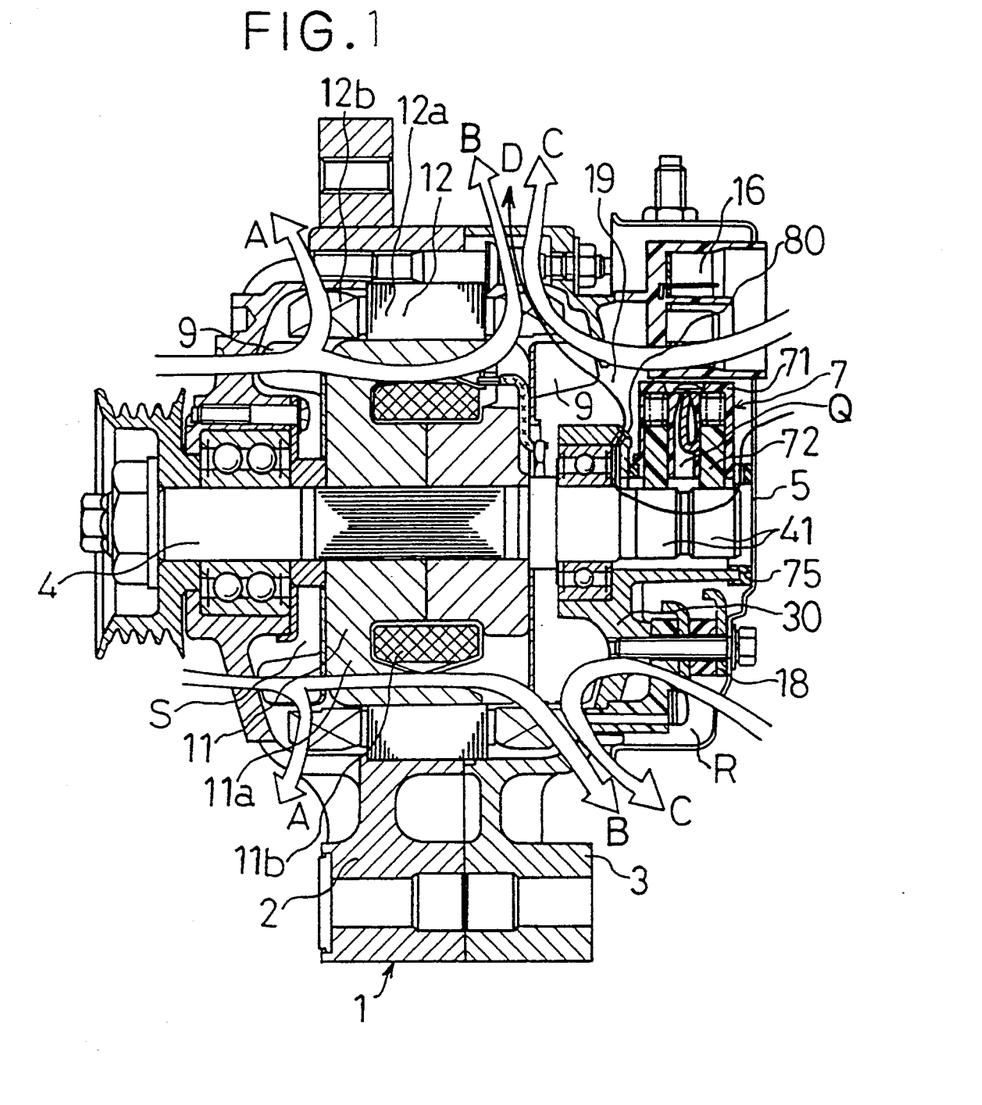
FIG. 1 is a sectional view showing a first embodiment of an explosion-proof type rotating electrical machine according to the invention.

An example is shown in FIG. 1 for an explosion-proof type rotating electrical machine according to the invention, which is used for a pawl-shaped magnet-pole type three phase synchronous generator used for a motorboat.

This generator has a housing 1 which rotatably supports a drive shaft 4. The housing 1 includes a front housing 2, a rear housing 3 connected to an opening of the front housing 2 and forming an inside space S, and a rear cover 5 covering a rear end wall 30 of the rear housing 3 and forming therein an electrical parts compartment R together with the rear housing 3. The inside space S and the electrical parts compartment R are "spaces in the housing" as referred to in the present invention. The drive shaft 4 is inserted and fixed to a rotor 11, around which a stator 12 is fixed on inner circumferences of both the housings 2 and 3. The rotor 11 is composed of a field core 11a fixed on the drive shaft 4 within the inside space S, and a field coil 11b wound around the field core 11a. The stator 12 is composed of a stator core 12a fixed on an inner circumference of the housing 1, and an armature coil 12b wound around the stator core 12a.

The electrical parts compartment R is incorporated with a regulator 16 used for rectifying a voltage of the generator, a brush assembly 7, and a rectifier 18, those of which are all attached on the rear end wall 30 of the housing 3 by screwing. A cooling fan 9 fixed on both ends of the rotor 11 produces cooling airs A, B, C, and D. The cooling air A is allowed to flow to an air outlet holed on a circumference wall of the front housing 2 through an air suction inlet holed on a front end wall of the front housing 2 and through a front portion of the inside space S.

The cooling air B enters from the air suction inlet holed on the front end wall of the front housing 2 and is discharged to the outside from the air outlet which is holed on a circumference wall of the rear housing 3 penetrating, in a shaft direction, a gap between pawl shaped magnet poles of the field core 11a.

The cooling air C, after being introduced from the outside space into the electrical parts compartment R within the rear cover 20, is introduced into a rear portion of the inside space S from an air suction inlet 19 holed on the rear end wall 12a of the rear housing 12, and discharged to the outside from the air outlet holed on a circumference wall of the rear housing 3.

The cooling air D, after being introduced from the outside to the electrical parts compartment R in the rear cover 20, is introduced to a rear portion of the inside space S from the air suction inlet 19 holed on the rear end wall 30 of the rear housing 3 through the brush compartment Q described later, and discharged to the outside from the air outlet holed on the circumference wall of the rear housing 3.

Figure 2:
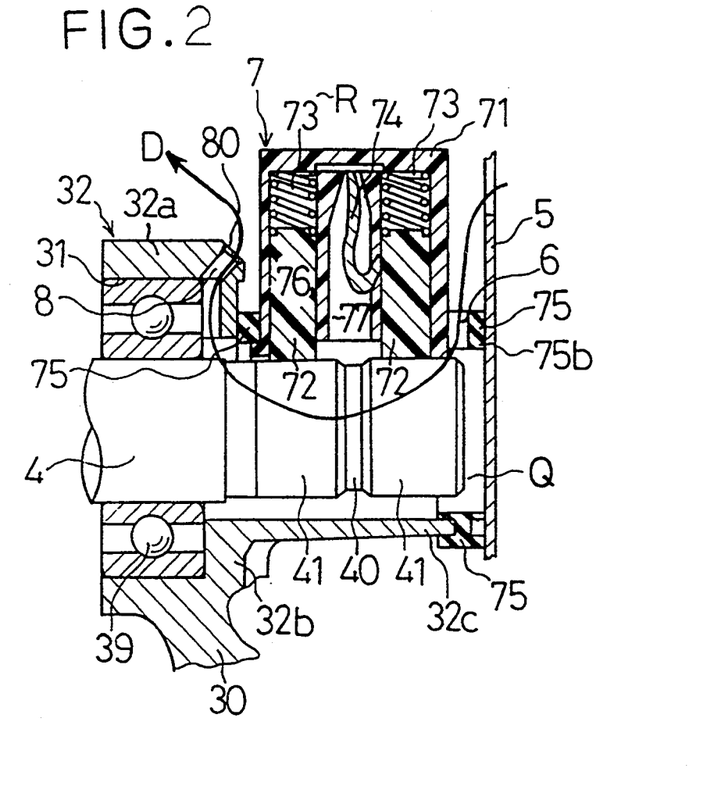
FIG. 2 is an enlarged sectional view of essentials of the embodiment in FIG. 1.

A feature of the embodiment will be described in detail referring to FIG. 2 being an enlarged view of essentials of FIG. 1. A center of the rear end wall 30 of the housing 3 is provided with a bearing cylinder section 32 in a manner protruding into the electrical parts compartment R. The bearing cylinder section 32 is composed of a bearing portion 32a of a large cylindrical shape which protrudes, from the rear end wall 30 of the housing 3, in parallel with the center line of the shaft, a shoulder portion 32b in a shape of ring plate extending in a radius direction toward the shaft center from a rear end of the bearing 32a, and a shaft embracing cylinder section 32c having a substantially cylindrical shape with both ends opened which protrudes into the rear side in parallel with the center line of the shaft from an inside end of the shoulder portion 32b. The shaft embracing cylinder section 32c is notched at an upper portion, as shown in FIG. 2, on which the brush assembly 7 is provided.

A ball bearing 39 incorporated in a bearing hole 31 holed on the bearing cylinder section 32 rotatably supports the drive shaft (a rotating shaft as referred to in the invention) 4, a rear end portion 40 of which protrudes into the electrical parts compartment R in a manner of penetrating the bearing hole 31, and the protruding drive shaft 4 is surrounded by the shaft embracing cylinder section 32, brush assembly 7, and rear cover 5.

The protruding shaft section 40 of the drive shaft 4, within the electrical parts compartment R, is inserted and attached with a pair of slip rings 41 made of hard-drawn copper at a predetermined interval with each other. A pair of insulative wires (not shown) is arranged from both slip rings 41 through a hole portion (not shown) to the drive shaft 4, and by using these insulative wires both slip rings 41 are connected to both ends of the field coil 11$b$ (see FIG. 1) of inside the space S.

The brush assembly 7 is provided immediately above the protruding shaft section 40 of the drive shaft 4, and includes a brush holder (referred to as "part of a brush casing" according to the invention) 71 with approximately a box shape, a pair of brushes 72 incorporated in the brush holder 71, a spring 73 and a pig tail 74, and a brush seal rubber (referred to as "remaining portion of the brush casing" according to the invention) 75 tightly attached on the outside of the brush holder 71.

The brush holder 71, made of resin and formed in one body in approximately a box shape, is made of PPS (polyphenylen sulphide) resin, and includes respective pairs of brush holes 76 and pig tail holes 77 respectively opened towards the protruding shaft section 40 of the drive shaft 4. Both brush holes 76 are inserted with the springs 73 and the brushes 72, where the springs 73 activate the brushes 72 so as to push out the brushes 72 from the brush holes 76, and by such activations the lower end surfaces of both brushes 72 are being pressed individually against the slip rings 41. The pig tail holes 77 incorporate the pig tails 77 which are wires for supplying electric power to the brushes 72.

The brush seal rubber 75, which is made of silicone rubber, is fixedly inserted on surfaces of the front, rear, left, and right each of the brush holder 71, and concurrently extends downward along the rear cover 5 to seal gaps between the bearing cylinder section 32 or the rear cover 5 and the brush holder 71 and a gap between the rear end of bearing cylinder section 32 and the rear cover 5.

In this way, the brush compartment Q is formed by being partitioned into the brush holder 71, brush seal rubber 75, bearing cylinder section 32, rear cover 5, ball bearing 39 and drive shaft 4.

Figure 11:
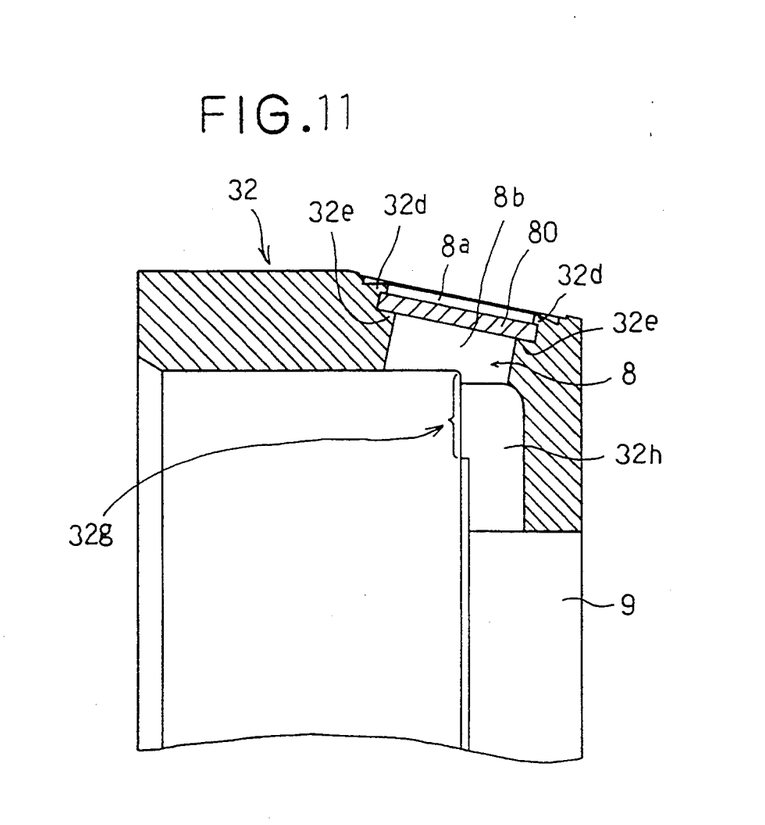
FIG. 11 is a sectional view of essentials for illustrating insertion of a flame stifling wire net.
Figure 12:
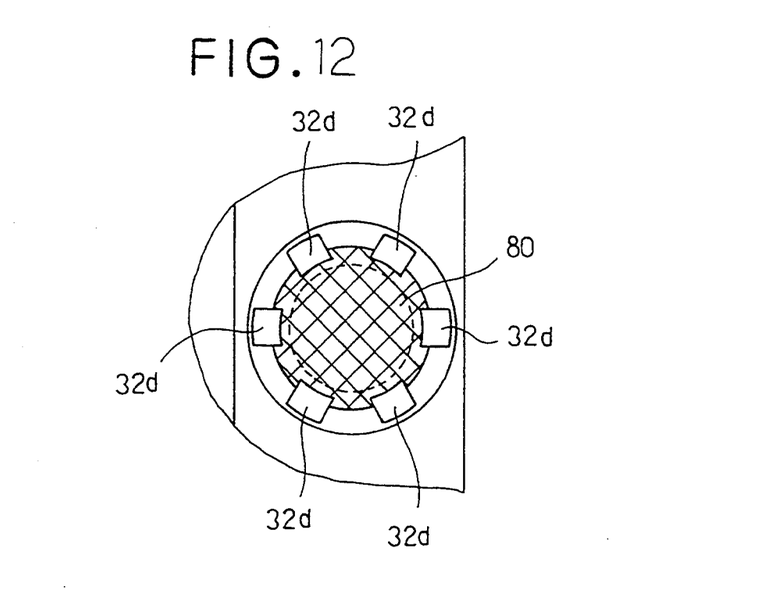
FIG. 12 is a sectional view of essentials for illustrating insertion of a flame stifling wire net.
Figure 13:
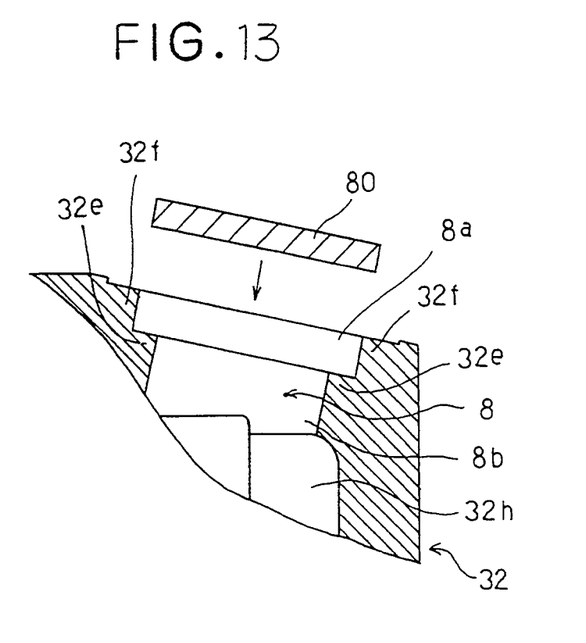
FIG. 13 is a sectional view of essentials for illustrating insertion of a flame stifling wire net, showing a state before the flame stifling wire net is inserted.

The bearing cylinder section 32 is provided with an air blowing path 8 in an oblique manner at a boundary portion between the bearing 32$a$ and the shoulder portion 32$b$, and the air blowing path 8 is inserted with a wire net 80 for extinguishing flames (a flame stifling wire net). The portion, which is inserted with the flame stifling wire net 80, will be described with reference to FIGS. 11 to 13. FIGS. 11 to 13 indicate an embodiment where the flame stifling wire net 80 is fixed by caulking, however, method of fixing according to the invention is not limited to caulking, but, includes also adhesion, welding, and the like.

FIGS. 11 and 12 are a state of fixing by caulking, and FIG. 13 is a state before being fixed by caulking. The air blowing path 8 will be described with reference to FIG. 11. The air blowing path 8 comprises a through hole having a large radius section 8$a$ and a small radius section 8$b$ and connecting the inside with the outside of the bearing cylinder section, and a groove 32$h$ connecting the through hole with the brush compartment 9. The groove 32$h$ is formed such that a contact portion 32$g$ in the axis direction with respect to the bearing (not shown) formed in a circular ring shape is partially notched. The flame stifling wire net 80 is held between a shoulder portion 32$e$ formed by both the large radius section 8$a$ and the small radius section 8$b$ of the through hole and the caulking portion 32$d$. The caulking portion 32$d$ is formed by caulking an opening end 32$f$ at a housing side of the large radius section 8$a$ shown in FIG. 13. As shown in FIG. 12, six caulking portions 32$d$ are formed. In this embodiment, the mesh gap of the flame stifling wire net 80 is made to be about 560 $\dashv$m, however, such a mesh gap is not limited to a value of 560 $\dashv$m. To obtain a satisfactory result of fixing, the mesh gap must be selected by considering the necessity of securing a contact area between the flame stifling wire net 80 and the bearing cylinder section.

A rear end portion 75$b$ of the brush seal rubber 75, which seals a gap between a rear end surface of the brush holder 71 and an inside surface of the rear cover 5, is provided with a concaved groove 6 penetrating in a vertical direction and facing the brush holder 71. The concaved groove 6 connects an upper portion of the electrical parts compartment R with the brush compartment Q to form the air suction path as referred to in the invention, as a result of the above the brush compartment Q is connected to the electrical parts compartment R through the air blowing path 8 and the concaved channel (air suction path) 6. Next brush cooling of this embodiment will be explained.

When the rotating electrical machine is started by applying current to the armature coil 12$b$ and simultaneously to the field coil 11$b$ through the brushes 72 and the slip rings 41, then the cooling fan 9 fixed on the drive shaft 4 generates the cooling air A, B, C, and D, where the cooling air A, B, and C cools each portion within the inside space S and the cooling air C further cools the electrical parts compartment R.

Also, the cooling air D is introduced to an upper stream side of the electrical parts compartment R from the air suction port opened at the rear end surface of the rear cover 5, and then discharged to a down stream side of the electrical parts compartment R through the concaved groove (air suction path) 6, the brush compartment Q and air blowing path 8, to be discharged thereafter to the outside space of the machine through the inside space S.

In this way, the cooling air D cools the brushes 72, slip rings 41, and ball bearing 39, and concurrently discharges to the outside, the brush powders which have fallen down from the brush 72 to the brush compartment Q.

Should a contact failure arise between the brush 72 and the slip ring 41, then a spark is generated therebetween, and this spark some times produces flames in the brush compartment R when operating in a flammable gas atmosphere. The flames thus generated propagate in a flow down direction of the cooling air, that is, to the air blowing path 8.

However in this embodiment, a flame stifling wire net 80 is provided on an outlet of the air blowing path 8, therefore the flames are extinguished by this flame stifling wire net 80, thus the flame propagation to the outside of the brush compartment Q is interrupted.

Figure 4:
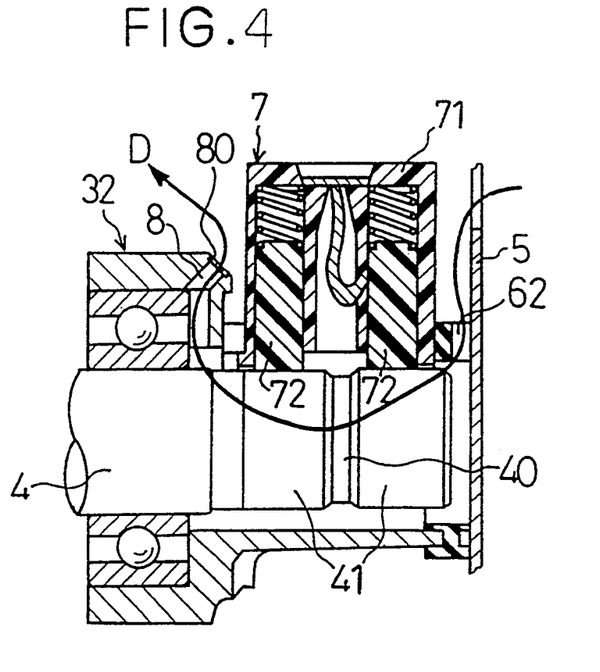
FIG. 4 is an enlarged sectional view of essentials showing another aspect of the embodiment shown in FIG. 1.
Figure 5:
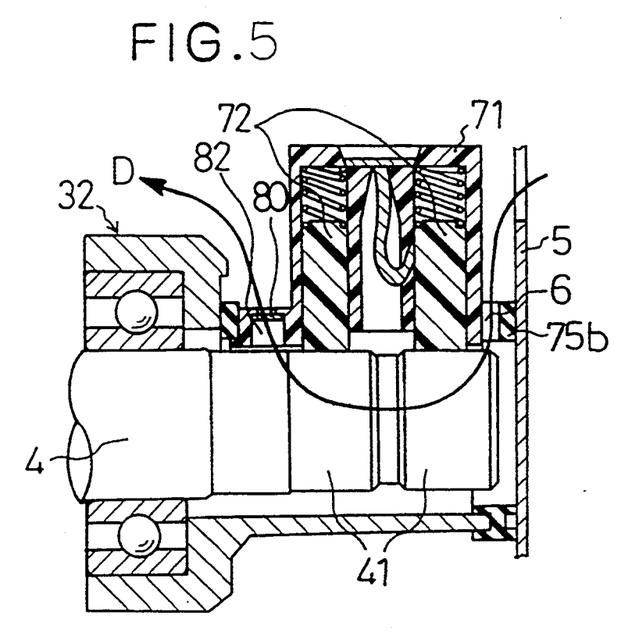
FIG. 5 is an enlarged sectional view of essentials showing further another aspect of the embodiment shown in FIG. 1.

The concaved groove (air suction path) 6 of the rear end portion 75$b$ of the brush seal rubber 75 may be provided on a portion facing the rear cover 5 as shown in FIG. 4. The air blowing path 8 may be holed on a front end portion of the brush holder 71 as shown in FIG. 5.

SECOND EMBODIMENT

Figure 6:
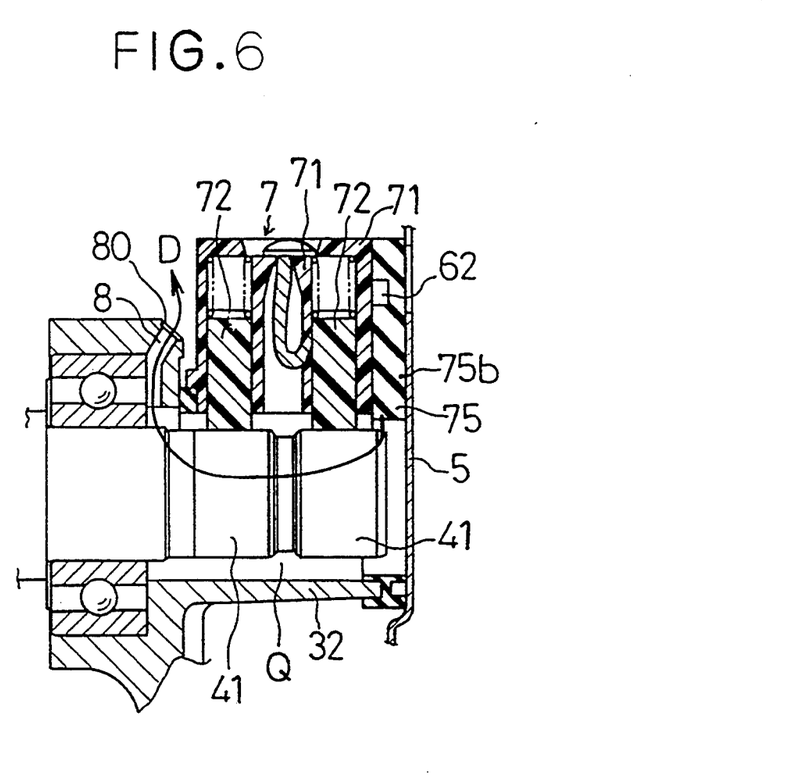
FIG. 6 is a sectional view showing a second embodiment of an explosion-proof type rotating electrical machine according to the invention.
Figure 7:
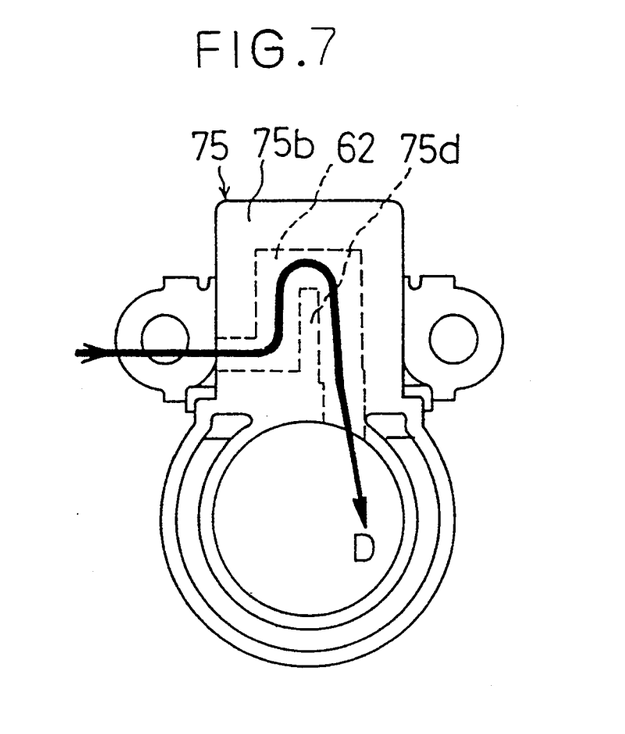
FIG. 7 is a rear-side view of a brush seal rubber of the embodiment in FIG. 6.

A feature of this embodiment, which will be described with reference to FIGS. 6 and 7, resides in a modification arrangement of the concaved groove 6 shown in FIG. 2, by forming the concaved groove 62 with a zigzag shape as shown in FIG. 7.

By this modification, the cooling air D, which has entered the concaved groove 62 from left side, of FIG. 7, strikes the partitioning wall portion 75d formed on the rear end portion 75b of the brush seal rubber 75, and after going round the periphery of the partitioning wall 75d to pass through downward, it reaches the brush compartment Q.

Accordingly, even if the flames in the brush compartment propagate in the concaved groove in the reverse direction (air suction path) 62 due to reduction of a air flowing speed and the like, the flames are cooled on a lengthy wall surface of the concaved groove 62 and extinguished, thus preventing the flames from leaking to the outside.

Figure 8:
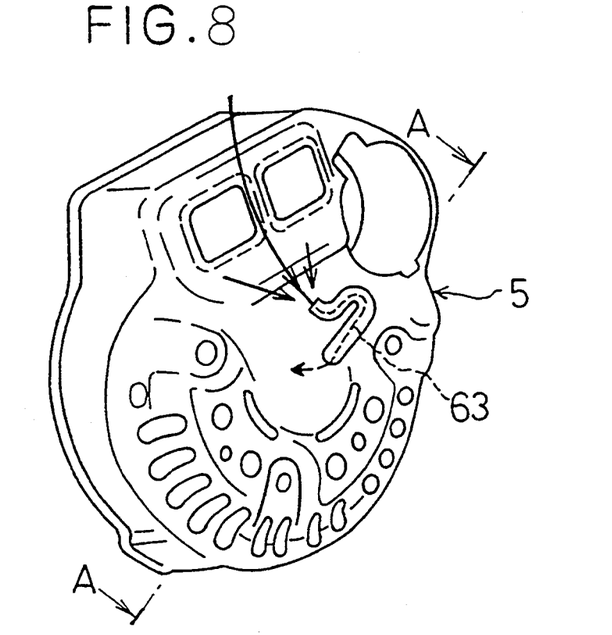
FIG. 8 is a perspective view of a rear cover showing another aspect of the embodiment in FIG. 6.
Figure 9:
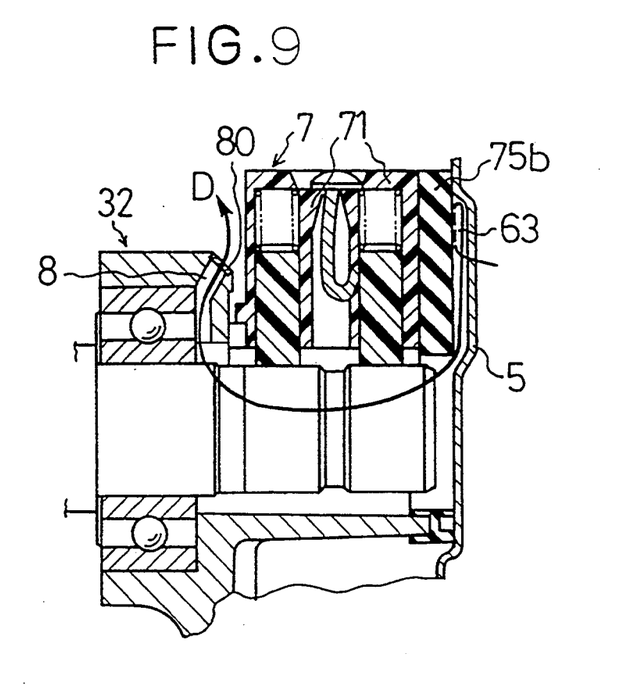
FIG. 9 is an enlarged sectional view of essentials for illustrating further another aspect of FIG. 8.

FIGS. 8 and 9 show another aspect of this embodiment. In the embodiment, a part of the rear cover 5 is allowed to protrude in the shaft direction to the rear-side (outside) to form the concaved groove 63 which is then closed at the flat surface of the rear end portion 75b of the brush seal rubber 75 to be used as air suction path.

In addition to the above, a surface in contact with the rear cover 5 of the rear end portion 75b of the brush seal rubber 75 may be concaved to form the cancaved groove, further, a through channel reaching both lateral surfaces of the rear end portion 75b of the brush seal rubber 75 may be shielded by both the rear cover 5 and the brush holder 71 to be used as air suction path. Furthermore, any particular metal member may form the air suction path.

In any way in this embodiment, the air suction path is formed in a way that a particular member is made hollow and then shielded by the other member to produce a concaved groove. Therefore, the complicated zigzag air suction path simply can be formed, thereby the production cost and processing steps to fabricate the same can largely be reduced.

THIRD EMBODIMENT

Figure 3:
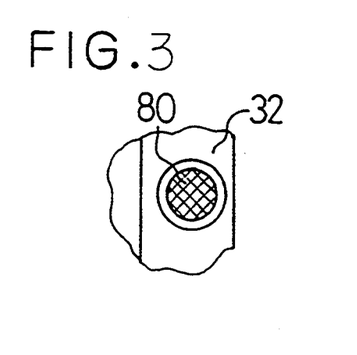
FIG. 3 is a front view of a wire net for stifling flames.
Figure 10:
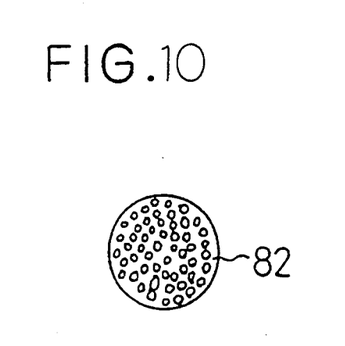
FIG. 10 is a front view showing a flame stifling wire net corresponding to a third embodiment of an explosion-proof type rotating electrical machine according to the invention.

In the third embodiment as shown in FIG. 10, a feature thereof is that the flame stifling wire net 80 in FIG. 3 is replaced, for example, by a flame stifling multi-hole plate 82 made of metal, which can exhibit similar effect and be easily made thicker.

In the embodiments hereinbefore described, the air blowing path 8 is provided on a brush-side of the drive shaft 4, however, it may be provided opposite to the brush-side of the drive shaft 4, such position may be selected depending on requirement.

What is claimed is:

1. A spark protected rotating electrical machine comprising:
    a housing having an end wall and a space;
    a rotating shaft, which rotates, disposed in the housing;
    a rotor disposed in the housing and fixed on the rotating shaft;
    a stator disposed in said housing;
    a cooling fan, which rotates with the rotating shaft, for generating an air flow and cooling air which are introduced from and discharged to outside of the housing, the cooling fan being disposed in the housing;
    an air flow path for guiding the air flow so that the air flow cools the rotor and the stator;
    a conductive contact member disposed on the rotating shaft;
    brushes that conductively contact the conductive contact member;
    a brush casing having a brush compartment disposed adjacent to the end wall of the housing, the brush compartment embracing the conductive contact member and the brushes;
    an air suction path for connecting the brush compartment with the outside of the housing and for guiding the cooling air from the outside of the housing to the brush compartment;
    an air blowing path for connecting the brush compartment with the space within the housing and for discharging the cooling air from the brush compartment to the space within the housing, the air suction path and the air blowing path being formed in series with each other and in parallel with the air flow path; and
    a flame stifling multi-holed member arranged on the air blowing path.

2. A spark protected rotating electrical machine as recited in claim 1, wherein the air suction path is formed in the shape of a maze.

3. A spark protected rotating electrical machine as recited in claim 1, wherein the flame stifling multi-hole member is a wire net.

4. A spark protected rotating electrical machine as recited in claim 1, wherein the flame stifling multi-hole member is a multi-holed plate.

5. A spark protected rotating electrical machine as recited in claim 1, wherein the air blowing path has a shoulder portion a front surface, a caulking portion, an opening in the front surface and an opening in the shoulder portion, which leads to the housing, an area of the opening Of the shoulder portion is smaller than an area of the opening of the front surface, and wherein the flame stifling multi-holed member is arranged on the shoulder portion and held between the caulking portion, which is formed by caulking the front surface and the shoulder portion.

6. A spark protected rotating electrical machine comprising:
    a housing having a space;
    a rotatable shaft rotatably disposed in the housing;
    a rotor disposed in the housing and fixed on the rotating shaft for rotation therewith;
    a stator disposed in the housing;
    a cooling fan, which rotates with the rotatable shaft, for generating an air flow which is introduced from and discharged to outside of the housing, the cooling fan being disposed in the housing;
    a first air flow path for guiding the air flow so that the air flow cools the rotor and the stator;
    a conductive contact member disposed on the rotatable shaft;
    brushes that conductively contact the conductive contact member;
    a brush casing having a brush compartment which embraces the conductive contact member and the brushes;
    a second air flow path for connecting the brush compartment with the space within the housing and for discharging air from the brush compartment to the space within the housing; and a flame stifling multi-holed member arranged on the air path.

7. An electrical machine according to claim 7, wherein the multi-holed member is a multi-holed plate.

8. An electrical machine according to claim 6, wherein the first air flow path and the second air flow path are joined together in the space.

9. An electrical machine according to claim 6, further comprising an air suction path for connecting the brush compartment with the outside of the housing for guiding a cooling air from the outside to the brush compartment.

10. An electrical machine according to claim 6, wherein the first air flow path and the second air flow path are in parallel relation to each other.

11. An electrical machine according to claim 9, wherein the air suction path is formed in the shape of a maze.

12. An electrical machine according to claim 6, wherein the multi-holed member is a wire-net.

* * * * *